United States Patent Office 2,743,302
Patented Apr. 24, 1956

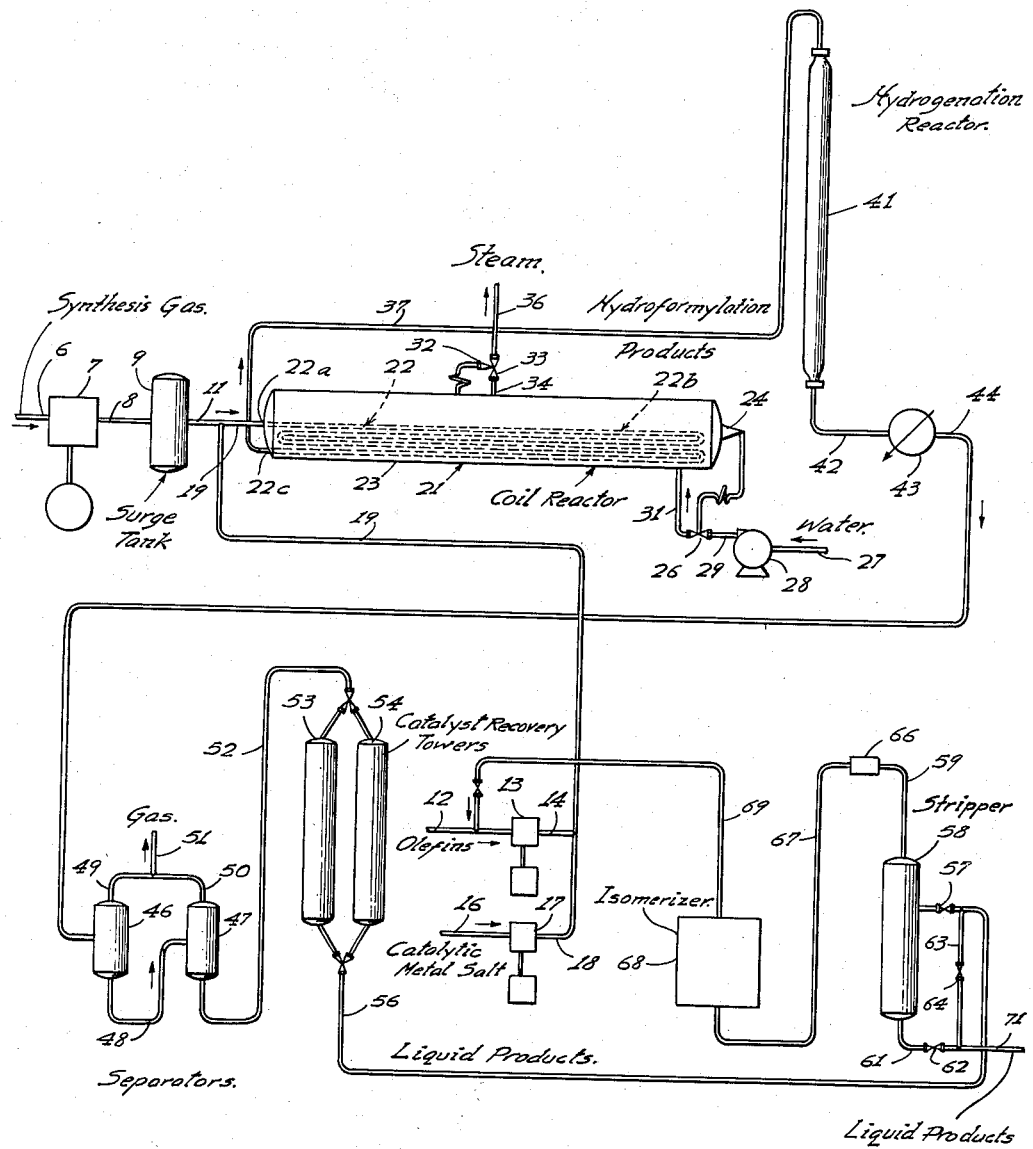

2,743,302

PRODUCTION OF ALCOHOLS BY OXO PROCESS

Bernard H. Gwynn, Tarentum, and Joel H. Hirsch, Oakmont, Pa., assignors to Gulf Research & Development Company, Pittsburgh, Pa., a corporation of Delaware Application May 25, 1950, Serial No. 164,212

4 Claims. (Cl. 260—638)

This invention relates to a process for producing alcohols from olefins, and more particularly to an Oxo process in which olefins are reacted with hydrogen and carbon monoxide to form hydroformylation products comprising aldehydes and in which the hydroformylation products are then hydrogenated to produce alcohols.

It has been proposed to carry out the hydroformylation stage of the Oxo process by reacting in the presence of a catalyst, hydrogen, carbon monoxide, and olefins at an advanced temperature in the range of 100° to 600° F. and an advanced pressure in the range of from 750 to 10,000 pounds per square inch. Because hydroformylation is very exothermic, the temperature must be carefully controlled. In addition, a rather long residence period, such as from 10 to 120 minutes, must be provided. The hydroformylation products comprise aldehydes and aldols mixed with unreacted olefins, hydrogen and carbon monoxide and with hydroformylation catalyst.

In order to produce the desired alcohols, the aldehydes are hydrogenated in the presence of a catalyst at an elevated temperature of from about 300° to about 600° F. and an advanced superatmospheric pressure such as from about 1500 to about 4500 pounds per square inch. It is necessary to adjust process conditions so that the hydroformylation catalyst in the hydroformylation products does not plug up or destroy the efficiency of the hydrogenation catalyst. Heretofore, before introducing the hydroformylation products to an efficient hydrogenation catalyst, it has been thought necessary not only to remove all of the solid catalyst but also to remove any catalyst which was dissolved in the reaction products. In addition, it has been thought necessary to remove substantially all of the carbon monoxide to prevent the poisoning of the hydrogenation catalyst. This has been accomplished, for example, by reducing the temperature and pressure of the hydroformylation products, filtering the hydroformylation catalyst which precipitates at the lower temperature and pressure, and separating carbon monoxide. When carbon monoxide is removed, some or all of the hydrogen is also removed from the remaining hydroformylation products and sufficient hydrogen for hydrogenation must be introduced. The mixture is then reheated and recompressed to the desired hydrogenation temperature and pressure.

The present invention relates to an improved Oxo process which does not require any temperature, pressure, or composition adjustment between the hydroformylation and hydrogenation stages and in which, at the same time, efficient hydroformylation and hydrogenation catalysts are employed. The process is therefore economical because the apparatus needed for the process has low initial, operating, and maintenance costs and because the process is simple to operate.

In accordance with our process, olefins, hydrogen, and carbon monoxide are reacted in the presence of a hydroformylation catalyst to produce a hydroformylation reaction mixture comprising reaction products including aldehydes, and other similar organic compounds such as aldols; unreacted constituents, namely, hydrogen, carbon monoxide and olefins; and the hydroformylation catalyst. The hydroformylation reaction mixture is then passed directly into contact with a bed of hydrogenation catalyst which is resistant to carbon monoxide poisoning.

Any olefin or mixture of olefins can be hydroformylated, but preferred results from a commercial viewpoint are obtained when the olefins contain at least 4 carbon atoms and especially preferred results are obtained when the olefins contain 4 to 16 carbon atoms. Examples of suitable olefins are hexenes, heptenes, octenes such as diisobutylenes, triisobutylenes, and tetraisobutylenes. The olefins can be 1-olefins or 2-olefins, a mixture of 1-olefins or a mixture of 2-olefins, or a mixture of 1- and 2-olefins. In general, because 2-olefins are first converted to 1-olefins, a somewhat longer reaction time or residence period is usually necessary when the mixture includes 2-olefins. It is a feature of our invention that when the process is carried out as described, the unreacted olefins in the hydroformylation reaction mixture pass through the hydrogenation stage substantially without hydrogenation. This is unexpected, but very advantageous, because of the greater value of the olefins than the corresponding paraffins which would be produced if the olefins were hydrogenated. Because there is continuous isomerization of the olefins occurring during the hydroformylation reaction and because only the 1-olefins are hydroformylated, the olefins from the hydroformylation stage are usually enriched in 2-olefins. We have found that when charging a mixture of 1- and 2-olefins containing about 80 per cent 1-olefins and 20 per cent 2-olefins, the olefins from the hydroformylation stage can be enriched in 2-olefins so much that the final composition comprises about 30 per cent 1-olefins and 70 per cent 2-olefins. The mixture of olefins can be separated from the hydrogenation products and can be used as such or if desired, the mixture can be isomerized to approximately the same composition as that of the mixture initially charged to the hydroformylation stage and the isomerized olefins can be recycled.

The hydroformylation reaction mixture can be produced by passing the mixture of olefins, hydrogen, and carbon monoxide over a fixed bed of hydroformylation catalyst. When this is done, a portion of the hydroformylation catalyst is dissolved in the reaction mixture. It can also be produced by introducing the hydroformylation catalyst dissolved in the olefins, and then carrying out the hydroformylation reaction.

The presently preferred method, however, of forming the hydroformylation reaction mixture is to pass a reaction mixture comprising hydrogen, carbon monoxide and a composition consisting essentially of olefins having dissolved therein a catalytic metal salt, preferably an iron or cobalt salt, through an elongated reaction vessel in indirect heat exchange relationship with a heat transfer medium under selected reaction and flow conditions such that undesirable deposition of the catalyst is avoided and selected hydroformylation temperatures are maintained through the reaction zone within a range of about 20° F. Especially preferred results are obtained when the catalytic metal salt is cobalt naphthenate or the cobalt salt of higher aliphatic acids such as 2-methyl hexanoic acid, lauric acid, palmitic acid and stearic acid.

The selected reaction conditions include a mixture of hydrogen and carbon monoxide in a mol ratio of from about 0.5:1 to 8:1, a hydroformylation pressure of from about 1500 to 4500 pounds per square inch, and hydroformylation temperatures in the range of from about 260° F. to about 460° F., the selected temperatures being maintained within a range of about 20° F.

When operating in accordance with the presently preferred method, especially preferred results can be obtained when the hydrogen to carbon monoxide mol ratio is maintained from 1:1 to 3:1 and particularly at about 3:1 the hydroformylation pressure is maintained at from about 3000 to about 4500 pounds per square inch; the hydroformylation temperature is maintained for a cobalt catalyst at temperatures selected from the range of about 260° to about 360° F. and particularly from about 300° to 340° F.; and the residence time is from about 10 to about 30 minutes. When an iron catalyst is employed preferred results are obtained with temperatures selected from the range of about 360° to about 460° F.

Under the reaction conditions described, with a residence period of from about 10 to about 30 minutes, desired flow conditions are obtained with an elongated reaction zone having a ratio of length to diameter, or elongation factor, of at least about 1440, and preferably from about 1450 to 72,000, a diameter of from about 1 to about 5 inches, a minimum Reynolds number of at least about 11,000 and a minimum average linear velocity of about 1 foot per second and preferably from about 1 to about 10 feet per second.

Any solid hydrogenation catalyst which is resistant to carbon monoxide poisoning can be employed to form the catalyst bed for the hydrogenation reaction. At present, no catalyst is known which can be efficiently employed to function as a hydroformylation catalyst and to form a solid bed of hydrogenation catalyst. To obtain desired results, the hydrogenation catalyst must operate efficiently at a hydrogenation pressure of from about 1500 to about 4500 pounds per square inch and at a temperature within the range of from about 300° to about 600° F. The space velocity can be in the range of from 0.1 to 2. We have found that preferred hydrogenation results are obtained with an oxide of a metal of the class consisting of chromium, manganese, copper, and cadmium. These oxides can be employed alone or in combination. For example, copper oxide, cadmium oxide or manganese oxide can be employed in a form combined with chromium oxide. While such combinations are sometimes referred to as chromites, it is almost invariably the case that one of the oxides is present in excess of the amount indicated by the formula of the chromite and therefore such compositions are more properly designated as combinations of the oxides and are so referred to herein. In general, especially preferred results are obtained with copper oxide or a combination of copper oxide and chromium oxide, especially at temperature ranges of from 300° to 400° F. The oxides can be employed either alone or in compositions containing promoters or stabilizers such as barium oxide.

A presently preferred embodiment of the process will now be described in connection with the accompanying drawing in which the single figure is a simplified flow sheet of a suitable unit. Referring to the single figure of the drawing, a synthesis gas with a hydrogen to carbon monoxide ratio of about 3:1 is introduced at a rate of about 580,000 standard cubic feet per stream day by means of line 6 to the compressor 7. The gas is compressed to a pressure of about 3500 pounds per square inch at a temperature of about 350° F. The compressed gas is passed by means of line 8 to the surge tank 9, and is removed from the surge tank 9 by means of line 11. About 107 barrels (1 barrel equals 42 gallons) per stream day of diisobutylene comprising about 84 per cent 1-diisobutylene (2,4,4-trimethylpentene-1) and about 16 per cent 2-diisobutylene (2,4,4-trimethylpentene-2) are introduced by means of line 12 to pump 13, and are discharged from the pump at a pressure of about 3500 pounds per square inch and a temperature of about 90° F. by means of line 14. About 470 pounds per day of cobalt naphthalenate which has an average molecular weight of about 632 and is dissolved in sufficient solvent naphtha to form a liquid containing about 6 weight per cent cobalt as cobalt naphthenate are introduced by means of line 16 to pump 17, and are discharged at a pressure of about 3500 pounds per square inch and a temperature of about 90° F. by means of line 18. The synthesis gas, the olefins, and the cobalt naphthenate in lines 11, 14, and 18, respectively, are combined in line 19 to form a mixture at a pressure of about 3500 pounds per square inch and a temperature of about 200° F. The mixture in mixed fluid phase, the synthesis gas containing liquid olefins in which is dissolved the cobalt naphthenate, is introduced into the coil reactor 21 at the beginning of the coil 22 at point 22a. The coil is made up of 2500 feet of two inch inside diameter tubing. The coil is maintained in a constant level of boiling water by means of liquid level controller 24 which actuates valve 26 and admits about 2050 gallons per stream day of water through line 27, pump 28, and line 29, to the valve 26, and then by line 31 to the coil reactor.

The temperature in the coil reactor is maintained at about 310° F. by adjusting the pressure control regulator 32 to operate valve 33 in the reactor discharge line 34 at about 63 pounds per square inch gauge pressure. Under these conditions about 10,200 pounds per stream day of steam are discharged through line 36.

The coil is sufficiently long so that preheating and hydroformylation can occur within it. The first or preheating portion of the coil 22 extends from the beginning of the coil at 22a to an intermediate point 22b. As soon as the mixture has been heated to a temperature of about 300° F., and the desired cobalt catalyst has been prepared dissolved in the olefins in a mixed fluid phase, the hydroformylation reaction occurs in the reaction portion of the coil which extends from the end of the preheating section at 22b to the end of of the coil at 22c.

The hydroformylation products comprising aldehydes, aldols, and other organic compounds and unreacted diisobutylene, hydrogen, and carbon monoxide and also comprising dissolved catalyst are removed from the hydroformylation reactor by means of line 37 at a temperature of about 310° F. and a pressure of about 3490 pounds per square inch. The hydroformylation products are passed directly at this temperature to the hydrogenation reactor 41 which is packed with the hydrogenation catalyst, copper chromite, formed of a combination of about 51 per cent copper oxide and about 49 per cent chromium oxide. In the hydrogenation reactor 41 the aldehydes are converted almost completely to alcohols while the olefins pass through substantially without hydrogenation. The hydrogenation of the aldehydes is exothermic and, therefore, the reactor 41 is provided with cooling means, not shown, effective to maintain a temperature between about 325° and about 350° F. Under these conditions the catalyst is not deposited.

The hydrogenation products are removed from the bottom of the hydrogenation reactor 41 by means of line 42 and, as removed, are at a temperature of about 350° F. and a pressure of about 3400 pounds per square inch. The hydrogenation products are then passed through the product cooler 43 and are discharged at a temperature of about 110° F. The products are introduced by line 44 to the separator unit comprised of separators 46 and 47. In separator 46 a mixture of hydrogen and carbon monoxide is removed overhead by means of line 49 from the first separator and the partially separated products are then transferred to the second separator 47 by means of line 48. A mixture of carbon monoxide and hydrogen is again removed overhead from this separator by means of line 50. The mixture of gases from lines 49 and 50 is combined in line 51 and is discharged at the rate of about 334,000 cubic feet per stream day. The mixture can be recycled and used in preparing the synthesis gas introduced by line 6. The stripped hydrogenation products are then passed by means of line 52 at a pressure of about 100 pounds per square inch to the catalyst removal towers 53 and 54 which are packed with an adsorbent, preferably pumice. The cobalt which has been formed at the reduced pressure is filtered out in the towers.

The liquid products comprising 28,700 pounds per stream day are then passed by means of line 56 containing valve 57 to the stripper 58. Almost 5350 pounds per stream day of olefins are removed overhead at a temperature below about 203° F. by line 59 and the olefin-free liquid products are passed to the product separation unit by line 61 which contains a valve 62. A line 63 with valve 64 is connected between inlet line 56 and outlet line 61 of the stripper. Valve 64 is kept closed while the stripper 58 is in operation; the stripper can be by-passed by closing valves 57 and 62 in the inlet and outlet lines of the stripper and opening valve 64 in the by-pass line. The olefins in line 59 containing about 30 per cent 1-olefin and 70 per cent 2-olefin are passed to a pressure reducing valve 66 and then by line 67 at about atmospheric pressure to isomerizer 68 which is operated in such manner as to change the composition of the olefins to substantially the composition of the olefin charge to the hydroformylation reactor. The isomerizer is preferably packed with alumina maintained at a temperature of about 500° F. The space velocity in the isomerization operation is selected so as to obtain the desired conversion. The products from isomerizer 68 containing about 84 per cent 1-olefins and 16 per cent 2-olefins are passed to line 12 for recycling by valved line 69.

The products from the stripper 58, from which the olefins have been removed, are passed by line 71 to the product separation unit, not shown, where 22,300 pounds of nonyl alcohol are removed leaving 5070 pounds of heavy residue.

In the presently preferred embodiment described above, cobalt naphthenate is employed as the hydroformylation catalyst. As previously stated, cobalt salts of higher aliphatic acids such as 2-ethyl hexanoic acid, lauric acid, palmitic and stearic acid also give preferred results. Iron salts are also of especial interest because they readily form a carbonyl which is maintained in solution in the reaction mixture in a manner similar to cobalt carbonyl.

In like manner, in the foregoing discussion a bed of a solid hydrogenation catalyst has been referred to. Generally, we prefer to employ a fixed bed of solid catalyst but the solid catalyst can also be disposed in a fluid bed or it may be employed in a solid moving bed type of operation.

It will be understood that when isomerizing the olefins recovered from the hydrogenation stage any suitable isomerization process, several of which are well known, can be used. The catalyst, however, is preferably one containing alumina, such as alumina itself, bauxite and the like.

The process of our invention is advantageous in that when operating in accordance with it, the products of the hydroformylation stage are passed directly to the hydrogenation stage without the necessity of cooling and decompressing the mixture discharged from the hydroformylation stage, removing carbon monoxide and therefore hydrogen at the same time, and then adding hydrogen to the remaining hydroformylation products and reheating and recompressing the resulting mixture to the desired hydrogenation temperature and pressure. In this connection, it will be understood that in some cases it may be desirable to make some adjustment in the temperature or pressure of the reaction mixture passing from the hydroformylation to the hydrogenation stage. A process involving such an adjustment possesses most of the advantages pointed out above as substantial cooling and decompression, removal of hydrogen and carbon monoxide, and addition of fresh hydrogen followed by recompression are not required, and precipitation of the hydroformylation catalyst is avoided.

Obviously many modifications and variations of the invention, as hereinbefore set forth, may be made without departing from the spirit and scope thereof, and therefore only such limitations should be imposed as are indicated in the appended claims.

We claim:

1. An Oxo process for producing alcohols which comprises reacting a mixture comprising hydrogen, carbon monoxide and an olefin in the presence of a cobalt hydroformylation catalyst at a hydroformylation pressure above about 1500 pounds per square inch and at selected hydroformylation temperatures in the range of about 260° to about 460° F. to produce a hydroformylation reaction mixture comprising aldehydes, unreacted olefins, hydrogen, carbon monoxide and dissolved cobalt carbonyl catalyst, directly passing said hydroformylation reaction mixture at substantially said pressure and temperature into contact with a bed of hydrogenation catalyst of the class consisting of oxides of chromium, manganese, copper and cadmium to hydrogenate said aldehydes in said hydroformylation reaction mixture and obtain a mixture containing the corresponding alcohols, said unreacted olefins and said dissolved cobalt carbonyl catalyst, and thereafter removing said dissolved cobalt carbonyl catalyst from the latter mixture.

2. An Oxo process for producing alcohols which comprises reacting a mixture comprising hydrogen, carbon monoxide and an olefin in the presence of a cobalt hydroformylation catalyst at a hydroformylation pressure above about 1500 pounds per square inch and at selected hydroformylation temperatures in the range of about 260° to about 460° F. to produce a hydroformylation reaction mixture comprising aldehydes, unreacted olefins, hydrogen, carbon monoxide and dissolved cobalt carbonyl catalyst, directly passing said hydroformylation reaction mixture at substantially said pressure and temperature into contact with a bed of hydrogenation catalyst of the class consisting of oxides of chromium, manganese, copper and cadmium to hydrogenate said aldehydes in said hydroformylation reaction mixture and obtain a mixture containing the corresponding alcohols, hydrogen, carbon monoxide, said unreacted olefins and said dissolved cobalt carbonyl catalyst, removing hydrogen and carbon monoxide from the latter mixture, reducing the pressure on said latter mixture to decompose said cobalt carbonyl and form cobalt metal, and thereafter separating the resulting mixture from said cobalt metal.

3. An Oxo process for producing alcohols which comprises reacting a mixture comprising hydrogen, carbon monoxide and a mixture of olefins comprising 1-diisobutylene and 2-diisobutylene in the presence of a cobalt hydroformylation catalyst at a hydroformylation pressure above about 1500 pounds per square inch and at selected hydroformylation temperatures in the range of about 260° to about 460° F. to produce a hydroformylation mixture comprising aldehydes, unreacted 1-diisobutylene and 2-diisobutylene, hydrogen, carbon monoxide and dissolved cobalt carbonyl catalyst, directly passing said hydroformylation reaction mixture at substantially said pressure and temperature into contact with a bed of hydrogenation catalyst of the class consisting of oxides of chromium, manganese, copper and cadmium to hydrogenate said aldehydes in said hydroformylation reaction mixture and obtain a mixture containing the corresponding alcohols, hydrogen, carbon monoxide, said dissolved cobalt carbonyl catalyst, and said unreacted 1-diisobutylene and 2-diisobutylene, separating hydrogen, carbon monoxide and dissolved cobalt carbonyl catalyst from the latter mixture, and recovering said unreacted olefins from the resulting mixture.

4. An Oxo process for producing alcohols which comprises reacting a mixture comprising hydrogen, carbon monoxide and a mixture of olefins comprising 1-diisobutylene and 2-diisobutylene in the presence of a cobalt hydroformylation catalyst at a hydroformylation pressure above about 1500 pounds per square inch and at selected hydroformylation temperatures in the range of about 260° to about 460° F. to produce a hydroformylation mixture comprising aldehydes, unreacted 1-diisobutylene and 2-diisobutylene, hydrogen, carbon monoxide and dissolved cobalt carbonyl catalyst, directly passing said hydroformylation reaction mixture at substantially said pressure and temperature into contact with a bed of hydrogenation catalyst of the class consisting of oxides of chromium, manganese, copper and cadmium to hydrogenate said aldehydes in said hydroformylation reaction mixture and obtain a mixture containing the corresponding alcohols, hydrogen, carbon monoxide, said dissolved cobalt carbonyl catalyst, and said unreacted 1-diisobutylene and 2-diisobutylene, separating hydrogen, carbon monoxide and dissolved cobalt carbonyl catalyst from the latter mixture, recovering said unreacted 1-diisobutylene and 2-diisobutylene from the resulting mixture, isomerizing the mixture of unreacted olefins to substantially the same composition as the olefin charge, and recycling the isomerized mixture to the hydroformylation stage.

References Cited in the file of this patent

UNITED STATES PATENTS

| | | |
|---|---|---|
| 2,327,066 | Roelen | Aug. 17, 1943 |
| 2,414,276 | Sensel et al. | Jan. 14, 1947 |
| 2,437,600 | Gresham et al. | Mar. 9, 1948 |
| 2,464,916 | Adams et al. | Mar. 22, 1949 |
| 2,491,915 | Barrick et al. | Dec. 20, 1949 |
| 2,504,682 | Harlan | Apr. 18, 1950 |
| 2,543,038 | McGrath | Feb. 27, 1951 |
| 2,595,096 | Parker | Apr. 29, 1952 |

OTHER REFERENCES

Meyer: Oxo Process, Translations of I G Farben Patent Applications (I 67 906 IVd/120, I 72 009 IVd/120, I 72 982 I 74 142 IVd/120 contained in TOM Reel 36 deposited in Lib. of Congress Apr. 18, 1946), pgs. 17–19, 38–39, 52–53 and 68–69 (1948).

Gilman: "Organic Chemistry," vol. 1, 2nd ed., 1947, John Wiley & Sons, New York, pgs. 788–9.

Oxo Process, Fiat Final Report #1000, Dec. 26, 1947, PB 81383, page 14.